United States Patent [19]

Strahsner

[11] 4,362,540

[45] Dec. 7, 1982

[54] APPARATUS FOR REMOVING DUST PARTICLES FROM AN AIR STREAM

[75] Inventor: Emanuel Strahsner, Hangweg, Austria

[73] Assignee: Voest-Alpine Aktiengesellschaft, Vienna, Austria

[21] Appl. No.: 289,075

[22] Filed: Jul. 31, 1981

[30] Foreign Application Priority Data

Aug. 5, 1980 [AT] Austria .............................. 4045/80

[51] Int. Cl.³ ............................................. B01D 50/00
[52] U.S. Cl. .................... 55/257 C; 55/403; 55/407; 55/408; 55/470
[58] Field of Search ............. 55/257 C, 401–403, 55/407, 408, 470

[56] References Cited

U.S. PATENT DOCUMENTS

| | | | |
|---|---|---|---|
| 1,262,571 | 4/1918 | Tait | 55/408 X |
| 1,480,775 | 1/1924 | Marien | 55/407 X |
| 1,511,834 | 10/1924 | Marien | 55/407 X |
| 3,282,032 | 11/1966 | King, Jr. et al. | 55/257 C X |
| 3,406,504 | 10/1968 | Sylvan | 55/408 |
| 3,486,314 | 12/1969 | Herrington | 55/408 |
| 4,145,197 | 3/1979 | Strahsner et al. | 55/257 C X |

*Primary Examiner*—Kathleen J. Prunner
*Attorney, Agent, or Firm*—Cushman, Darby & Cushman

[57] ABSTRACT

The apparatus for removing dust particles from an air stream, particularly for ventilating mines, comprises a centrifugal separator (3), which rotates in a housing (1), a blower (4), and a device (6, 7) for spraying or atomizing water and for delivering it to the air stream entering the centrifugal separator (3). The centrifugal separator (3) comprises a plurality of blade wheel sections (8, 9) having blades (14) which are joined to walls (10) which flare like funnels. The blades of said blade wheel sections (8, 9) extend approximately in axial planes. Said blade wheel sections (8, 9) are preceded at the air inlet end by at least one blade/wheel section (15) in which the generatrices of the blade surfaces (blades 17) which are equidistant from the axis are inclined by an angle of incidence ($\alpha$) from lines which extend parallel to an axial plane (21), in a sense which is opposite to the sense in which the resultant vector (R) of the axial air entry velocity (v) and the peripheral velocity (u) of the blades (17) is inclined from the axial plane (21) (FIG. 2).

13 Claims, 8 Drawing Figures

APPARATUS FOR REMOVING DUST PARTICLES FROM AN AIR STREAM

This invention relates to an apparatus for removing dust particles from an air stream, particularly for the ventilation of mines, comprising a centrifugal separator, which rotates at an approximately constant speed and comprises axially aligned blade wheel sections, which rotate within a stationary housing and have blades which at their outer ends adjoin co-rotating peripheral walls, the distance of which from the axis increases in the direction of flow of the air, at least one of said blade wheel sections having blades which extend radially approximately in axial planes and those portions of the peripheral walls which are spaced the largest distance from the axis being formed with passage openings facing the housing, further comprising a blower for moving the air stream through the centrifugal separator, and a device which precedes the centrifugal separator in the direction of flow of the air and serves to spray or atomize water and to deliver it into the air stream entering the centrifugal separator.

In such known apparatus the blades of all blade wheel sections of the centrifugal separator extend approximately in axial planes and the dust particles bonded by droplets of water and the air by which said dust particles are extrained impinge on the blades of the first blade wheel section at a velocity which corresponds to the full peripheral velocity of the centrifugal separator. The resulting impacts give rise to losses, which increase as the square of the peripheral velocity of the blades. These impacts involve a high power requirement and because the losses due to said impacts increase as the square of the peripheral velocity of the blades these losses impose also a limit on the speed of the centrifugal separator. In the known apparatus of that kind the blower which moves the air through the centrifugal separator constitutes a separate unit, which is disposed behind the centrifugal separator and is connected to the latter by a duct or hose. A considerable power is required to deflect the air from the centrifugal separator to the blower; this fact imposes also a limit on the speed of the centrifuge and of the blower. For these reasons the known apparatus of that kind have relatively large overall dimensions and this is undesirable particularly for use in mines.

It is an object of the invention to minimize the power required to drive such dust collector and to permit its operation at a higher speed so that the centrifugal separator is more effective. The invention resides essentially in that the blade wheel section(s) provided with blades extending in axial planes are preceded at the air inlet end of the centrifugal separator by at least one blade wheel section in which those generatrices of the blade surface which are equidistant from the axis are inclined at an angle of incidence from lines extending in the axial plane parallel to the axis, in a sense which is opposite to the sense in which the resultant vector of the axial air entry velocity and the peripheral velocity of the blades is inclined from the axial plane.

Because the blades of the preceding blade wheel section do not extend in axial planes but are inclined from the axial plane in a sense which is opposite to the inclination of the resultant vector, i.e., said blades are inclined like those of an axial-flow blower, the water droplets and the air impinge on the blades with a smaller force so that said impacts in said preceding blade wheel section involve much smaller losses.

If the angle of incidence is approximately as large as the angle included by the resultant vector and the axial plane, the rotation of said preceding blade wheel section will cause the axially entering air to flow parallel to the rotating blade surfaces so that there is no component of motion of the air or water droplets relative to the blade surfaces and the losses due to the impacts in said preceding blade wheel section will be zero and the air and water droplets move through said blade wheel section without obstruction. But such an arrangement would involve losses due to the impacts in the blade wheel sections having axially extending blades.

In a preferred embodiment of the invention that angle of incidence is smaller than the angle included by the resultant vector and the axial plane. In accordance with Bernoulli, the losses due to the impacts on a blade extending in an axial plane are proportional to the square of the peripheral velocity of the blades. As the blades are inclined, only that component of the impact force which is normal to the blade plane acts on said blades so that the losses due to the impacts in said preceding blade wheel section are smaller than the losses due to the impacts on blades extending in axial planes. As the angle of incidence of the blades in said preceding blade wheel section is smaller than the angle included by the resultant vector and the axial plane, a component of motion in an axial direction and a component of motion in the direction of the peripheral velocity are imparted to the air and the water droplets. The component of motion in an axial direction assists the action of the blower and owing to the component of motion in the direction of the peripheral velocity the air and the water droplets have a component of motion in the direction of the peripheral velocity as they enter and flow in the next succeeding blade wheel section, which has blades extending in axial planes. That component of motion in the peripheral direction must be subtracted from the peripheral velocity of the blades in said succeeding blade wheel section so that the droplets and the air impinge on the blades of said succeeding blade wheel section at a lower velocity relative to said blades. As the losses due to the impacts are proportional to the square of the velocity, as has been mentioned, the losses due to the impacts in said blade wheel section having blades extending in axial planes are much reduced. It is apparent that the blade wheel section having inclined blades will reduce the total losses which are due to the impacts in the centrifugal separator. If, in accordance with the invention, the angle of incidence is about one-half of the angle included by the resultant vector and the axial plane, the component of velocity which is at right angles to the surface of the blade in the preceding blade wheel section having inclined blades, relative to the blade surface, will be only about one-half of the corresponding component of velocity in a blade wheel section having blades extending in axial planes, and in the first blade wheel section having blades extending in axial planes the velocity of the air and of the water droplets in the direction of the peripheral velocity of the blade wheel will be only one-half the peripheral velocity of the blades of the blade wheel section. As a result, the relative velocity at which the air and water droplets impinge on the blade surfaces in the blade wheel section or sections which succeed the preceding blade wheel sections will be only one-half of the velocity which would be obtained if the air flowed axially into said blade wheel sections. For this reason the relative velocities between the air and water droplets, on the one hand, and the blade surfaces, on the other hand, will be reduced to one-half and as the losses due to the impacts are proportional to the square of the impact velocity said losses will be reduced to one-fourth. This results in a substantial total reduction of the losses due to the impacts in the centrifugal separator so that the speed of such centrifugal separator can be greatly increased and the required drive power can be substantially reduced at the same time.

Because the air inlet opening to the blower directly adjoins the air outlet opening from the last blade wheel section of the centrifugal separator, the losses at the outlet end of the centrifugal separator are greatly reduced too as the air leaving the centrifugal separator has already a component of motion in the direction of the peripheral velocity; that component of motion is utilized in the blower. This will be particularly true if, in accordance with the invention, the blower consists of a radial-flow blower. The air inlet opening to the blower is preferably constituted by the air outlet opening from the last blade wheel section of the centrifugal separator.

The resultant vectors of the axial air entry velocity and the peripheral velocity of the blades obviously have different directions in different radial portions of the preceding blade wheel section as the peripheral velocity increases with the distance from the axis.

In accordance with the invention the angle of incidence of the blades of the preceding blade wheel sections may correspond in all radial length portions of said blades to the value which is in accordance with the peripheral velocity in the respective radial length portion. In that case optimal conditions are equally obtained in all radial length portions. In accordance with the invention the arrangement may be such that the leading and trailing edges of the blades of the preceding blade wheel section are curved and the intermediate portion of each blade is not warped. But such blades are relatively expensive. For this reason, in a preferred embodiment of the invention the blades of the preceding blade wheel section are flat and have an angle of incidence which is in accordance with the mean peripheral velocity obtained in the middle of the radial length of the blades. In that case the blades will be much simpler in design and less expensive because flat blades can be made more easily. Nevertheless the approximation is sufficient for good results.

Because the losses due to the impacts at the inlet end of the centrifugal separator and the exit losses are reduced so that the speed of the centrifugal separator can be increased, the dust collector may be smaller in diameter. Owing to the higher speed, fewer blade wheel sections having blades extending in axial planes will be required in the centrifugal separator so that the overall length of the dust collector may be greatly reduced. The overall length will also be reduced by the fact that the inlet opening of the blower directly adjoins the outlet opening of the centrifugal separator. The higher speed results also on a higher efficiency of the dust collection. The reduction of the smaller overall dimensions will be particularly desirable if such dust collector is used in a mine, where space is restricted.

The high losses due to the impacts previously restricted the speed of the centrifugal separator. On the other hand, the blower is suitably operated at a higher velocity for a strong blower action. As the centrifugal separator can now be operated at a much higher speed, the centrifugal separator and the blower can be operated at the same speed. In a preferred embodiment of the invention the centrifugal separator and the blower are mounted on a common shaft. In this way the overall length will be further reduced.

In accordance with the invention each blade wheel section and/or the blower or each blower stage may be divided into separate units, which are adapted to be fitted and non-rotatably connected to the common shaft. As a result, the dust collector may constitute a modular system which can be adapted to different requirements, e.g., the raising of dust at different rates, by the provision of an additional blade wheel section of the centrifugal separator or the removal of such section or by the selection of a suitable number of blower stages.

In a desirable arrangement, the air inlet opening to the blower directly adjoins the air outlet opening from the last blade wheel section of the centrifugal separator.

An embodiment of the invention is shown diagrammatically and by way of example on the drawing.

Figure 1:
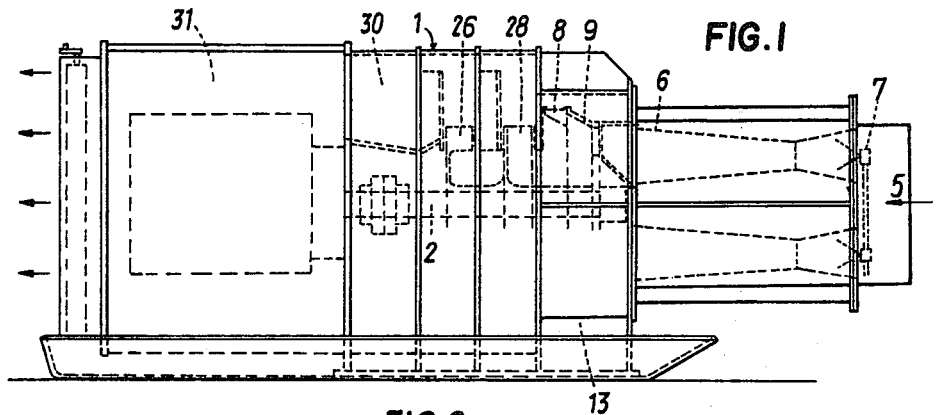
FIG. 1 shows the entire arrangement.
Figure 2:
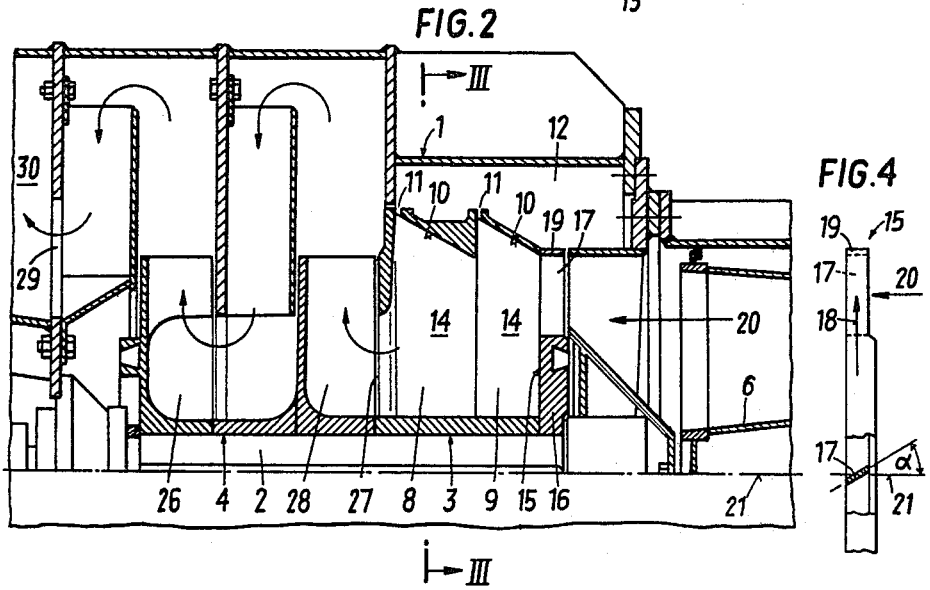
FIG. 2 is an axial sectional view taken on a plane extending through the centrifugal separator and the blower and shows a portion of FIG. 1.

A housing 1 accommodates a centrifugal separator 3 and a blower 4, which are mounted on a common shaft 2 for rotation therewith. The entry of air is indicated by an arrow 5. Venturi tubes 6 are shown as well as spray nozzles 7, which deliver sprayed or atomized water to the air flowing through the venturi tubes 6, in which the droplets of water are thoroughly mixed with the flowing air. The blower 4 sucks the air through the venturi tubes 6 and the centrifugal separator 3.

The centrifugal separator 3 comprises two blade wheel sections 8 and 9, which have blades 14 extending radially in axial planes. The rotating blades 14 impart a swirl to the air which flows through the centrifugal separator 3 so that the dust particles laden with the water droplets impinge on the blades and under the action of the centrifugal force reach funnellike flaring walls 10, which are connected to the blades 14. The water-laden dust particles are then moved through openings 11 into a housing chamber 12, which surrounds the centrifugal separator, and subsequently enter a sump in the lower portion 13 of the housing chamber 12.

Figure 4:
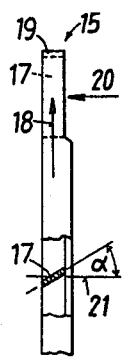
FIG. 4 is an elevation showing the preceding blade wheel section viewed at right angles to the axis.

The blade wheel sections 8 and 9 are preceded, in the direction of flow of the air, by a blade wheel section 15, in which the blades 17 do not extend in radial axial planes but are inclined to include an angle $\alpha$ with said axial planes (see FIG. 4). That blade wheel section 15 is also non-rotatably connected at its hub 16 to the shaft 2 to rotate at the same speed as the blade wheel sections 8 and 9.

Figure 3:
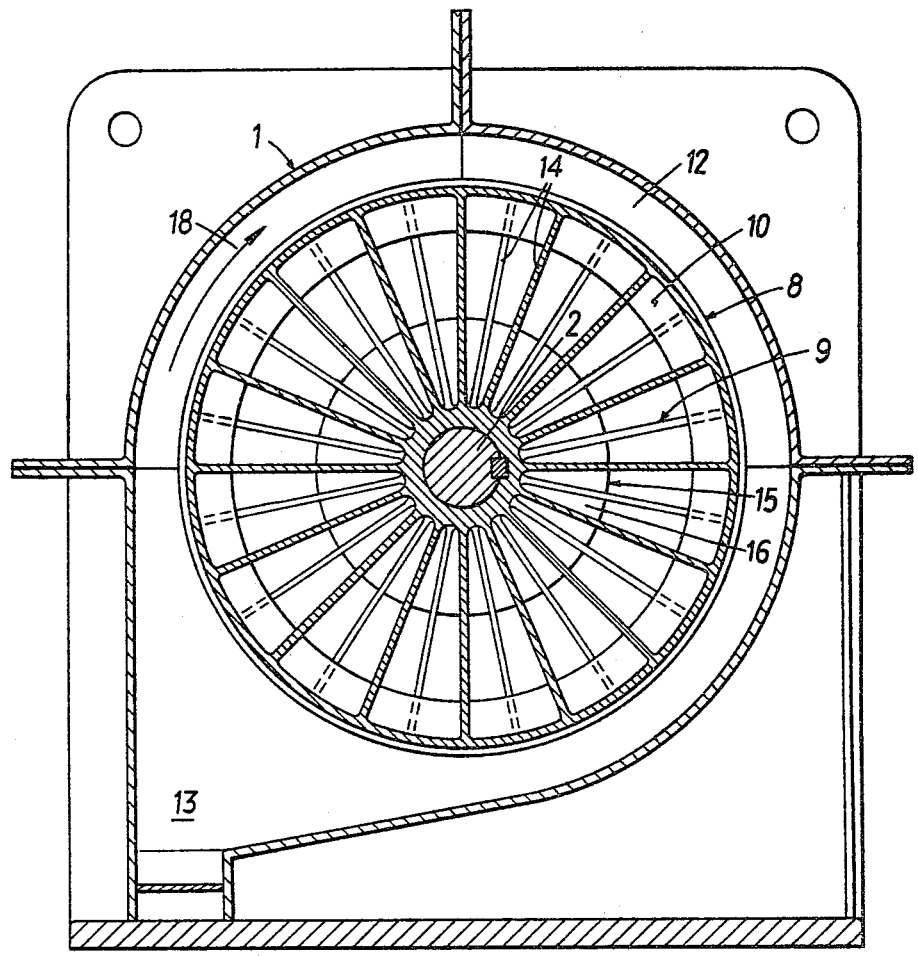
FIG. 3 is a section view taken on line III—III in FIG. 2.

The sense of rotation of the blade wheel sections is indicated by an arrow 18 in FIGS. 3 and 4. FIG. 4 is a side elevation showing the preceding blade wheel section 15. In FIG. 4 the peripheral wall 19 enclosing said blade wheel section is shown torn open in the middle so that the position of the blades 17 can be seen.

Figure 5:
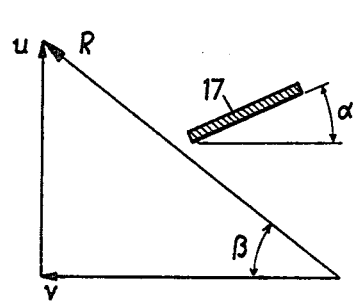
FIGS. 5 and 6 are velocity diagrams.

FIG. 5 is a diagram illustrating the flow of the air. The air flows in the direction of the arrow 20 at a velocity v to the blade wheel section 15. u is the mean peripheral velocity obtained at one-half of the radial length of the blades 17. R is the resultant vector of the entry velocity v and the mean peripheral velocity u. $\beta$ is the angle between the resultant R and the axial plane. The blades 17 are inclined from the axial plane 21 by an angle of incidence $\alpha$ in a sense which is opposite to the sense in which the resultant vector of the axial air entry velocity v and the mean peripheral velocity u is inclined from the axial plane 21. Owing to the blade wheel section 15 having inclined blades 17 the air entering the blade wheel sections 8 and 9 has a component of velocity in the direction of the peripheral velocity so that the force with which the air and the droplets impinge on the blades 14 is reduced.

Figure 7:
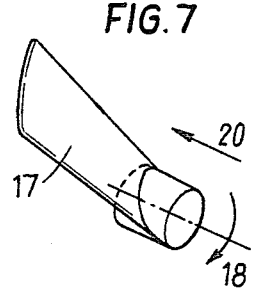
FIGS. 7 and 8 show embodiments of the blades of the preceding blade wheel section.

The diagram of FIG. 5 is based on the assumption that the blades have the same angle of incidence $\alpha$ in all radial length sections and only the mean peripheral velocity u has been taken into account. This will be applicable to a blade 17 as shown in FIG. 7, which is flat and can be made simply and at low cost.

Figure 6:
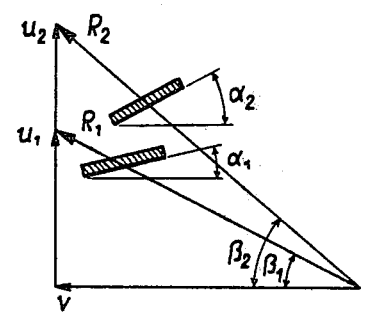
Figure 8:
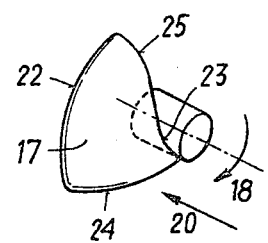

The peripheral velocity $u_1$ at the inner end of the blades will obviously be lower than the peripheral velocity $u_2$ at the outer end of the blades. This is illustrated in the diagram of FIG. 6. As a result, the angle $\beta_1$ included by the resultant vector $R_1$ and the axial plane 21 is smaller than the angle $\beta_2$ included by the resultant vector $R_2$ and said axial plane. In this case the blades 17 are spatially curved, as is shown in FIG. 8. Obviously the manufacture of such blades is more expensive. In FIG. 8 the periphery of the blade is designated 22, the root of the blade is designated 23, the leading edge is designated 24 and the trailing edge is designated 25. The sense of rotation is again indicated by the arrow 18.

The inlet of the blower is directly connected to the outlet end of the centrifugal separator 3. The air leaves the centrifugal separator 3 through an outlet opening 27, which consists of an annular gap close to the axis and constitutes the inlet opening to the first stage 28 of the blower 4. The flow path of the air in the outlet-inlet opening 27 and in the blower is indicated by arrows. The air flows through an annular gap 29 from the blower into a chamber 30 and is blown out from the latter through a succeeding dust filter 31.

I claim:

1. Apparatus for removing dust particles from an air stream, particularly for the ventilation of mines, said apparatus including a centrifugal separator having an air inlet end and an air outlet end and having blade wheel sections driven via a common shaft to rotate at an approximately constant speed within a stationary housing, said blade wheel sections having blades extending in axial planes connected with their radially outer ends to co-rotating peripheral walls, the distance of which walls from the axis of rotation of the blade wheel sections increasing in the direction from the inlet end to the outlet end of the centrifugal separator, at least one of said blade wheel sections having blades radially extending approximately in axial planes, and those portions of said peripheral walls which are spaced the largest distance from the axis having passage openings opening toward the housing surrounding the blade wheel sections, a blower connected to the outlet end of said centrifugal separator for moving the air stream through the centrifugal separator, and a means which precedes the centrifugal separator in the direction of flow of the air for spraying water into the air stream entering the centrifugal separator, characterized in that said blade wheel sections are preceded at the air inlet end of the centrifugal separator by at least one blade wheel section in which those generatrices of the surface of its blades which are equidistant from the axis are inclined at an angle of incidence from lines extending in axial planes parallel to the axis, in a direction which is opposite to the direction in which the resultant vector of the axial air entry velocity vector and the mean peripheral velocity vector of the blades of said preceding blade wheel section is inclined with respect to an axial plane extending through the axis of the centrifugal separator.

2. Apparatus according to claim 1, characterized in that said angle of incidence is smaller than the angle included by said resultant vector and the axial plane.

3. Apparatus according to claim 1, characterized in that the angle of incidence is about one-half of the angle included by said resultant vector and the axial plane.

4. Apparatus according to any one of claims 1, 2 or 3, characterized in that said angle of incidence of the blades of said preceding blade wheel section corresponds in all radial length portions of said blades to the value which is in accordance with the peripheral velocity in the respective radial length portion.

5. Apparatus according to claim 4, characterized in that leading and trailing edges of the blades of said preceding blade wheel section are curved and the intermediate portion of each blade is not warped.

6. Apparatus according to any one of claims 1, 2 or 3, characterized in that the blades of said preceding blade wheel section are plane and have an angle of incidence which is in accordance with the mean peripheral velocity obtained in the middle of the radial length of the blades.

7. Apparatus according to any one of claims 1, 2 or 3, characterized in that the blower is a radial-flow blower.

8. Apparatus according to any one of claims 1, 2 or 3, characterized in that the blower has an air inlet opening formed by an air outlet opening from the last blade wheel section of the centrifugal separator.

9. Apparatus according to any one of claims 1, 2 or 3, characterized in that the centrifugal separator and the blower are mounted on said common shaft.

10. Apparatus according to any one of claims 1, 2 or 3, characterized in that each blade wheel section is divided into separate units, which are non-rotatably connected to said common shaft.

11. Apparatus according to any one of claims 1, 2 or 3, characterized in that said blower has an air inlet opening which directly adjoins an air outlet opening from the last blade wheel section of the centrifugal separator.

12. Apparatus as in any one of claims 1, 2 or 3 wherein said blower is divided into separate units which are non-rotatably connected to said common shaft.

13. Apparatus as in any one of claims 1, 2 or 3 wherein said blower includes a plurality of stages each divided into separate units which are non-rotatably connected to said common shaft.

* * * * *